May 30, 1972  L. BEAUDOIN ET AL  3,666,323
WHEEL CONSTRUCTION
Filed Dec. 23, 1969
2 Sheets-Sheet 1
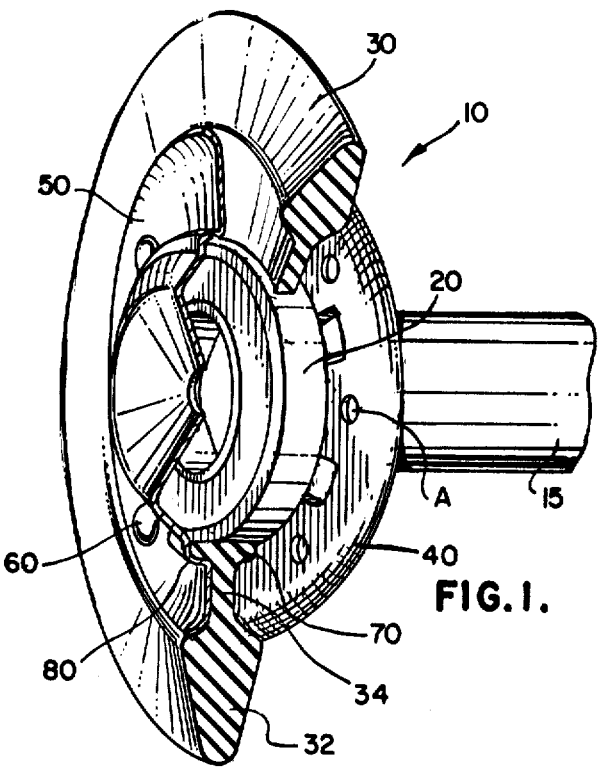
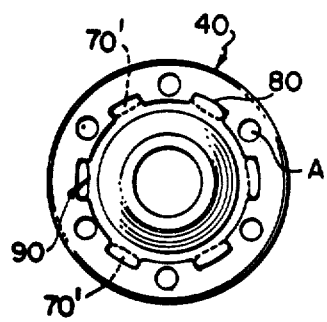
FIG.2.
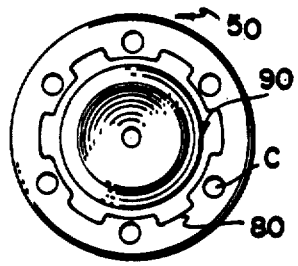
FIG.4.
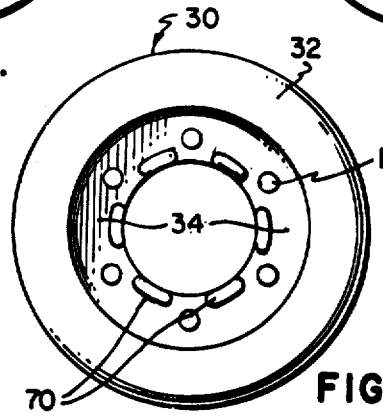
FIG.3.

United States Patent Office 3,666,323
Patented May 30, 1972

3,666,323
WHEEL CONSTRUCTION
Laurent Beaudoin and Sarto Richer, Valcourt, Quebec, Canada, assignors to Bombardier Limited, Valcourt, Quebec, Canada
Filed Dec. 23, 1969, Ser. No. 887,630
Claims priority, application Canada, Aug. 20, 1969, 60,053
Int. Cl. B60b 3/08
U.S. Cl. 301—63 DD                                  6 Claims

ABSTRACT OF THE DISCLOSURE

An improved bogie wheel in which the rubber tire is positively secured to the flanges by means of axially extending integral lugs that cooperate with corresponding formations or the inner faces of the flanges.

---

This invention relates to the structure of bogie wheels as used in the suspension systems of relatively small track-laying vehicles, particularly snowmobiles.

PRIOR ART

Conventional bogie wheels normally consist of two generally similar flanges facing one another and a solid rubber tire defining a tread portion and an inner ring portion of which the latter is confined to the space between the peripheral margins of the flanges. The flanges are maintained in the above noted relative position by means of axially disposed mechanical fasteners, for example rivets or bolts. To this end the flanges are provided with a series of circularly disposed apertures to which correspond axial perforations in the inner ring portion of the tire. The assembly is suitably journalled to the supporting shaft by means of a bearing in a well known manner.

Bogie wheels of such construction have been used successfully for a number of years on relatively low powered snowmobiles. However, at high rotational speeds the rubber tires were found to have a strong tendency to expand radially and even leaves flanges completely. In fact, hitherto, high performance snowmobiles could easily loose one or more bogie wheel tires during speed or "drag" races. The result of course is a noticeable speed reduction and probable damage to the inside surface of the track against which the edges of the flanges are then forced to roll.

OBJECTS OF THE INVENTION

This invention aims at providing a bogie wheel of the type described capable of withstanding high centrifugal forces, without sacrificing the simplicity, the ease of assembly and the low cost of production of the above described prior construction.

SUMMARY OF THIS INVENTION

We have discovered that the above noted objects can be achieved by means of a series of axially projecting lugs disposed on and integral with the inner ring portion of a tire made of rubber or other suitable flexible material with or without reinforcement, and corresponding retaining means on the inside of the flanges adapted to receive the lugs and oppose any radial displacement thereof away from the axis of rotation of the wheel. The lugs are substantially equidistant from one another and from the axis of rotation of the wheel.

Preferably the number of lugs is twice the number of perforations on the inner ring portion of the tire, and each lug is disposed directly behind a lug on the opposite face of the tire.

In a preferred embodiment according to this invention, the lugs are of elongated shape and are disposed along the inner periphery of the tire. The length of the lugs may be of the order of the space separating two successive lugs, while their height may be roughly equal to their width. In particular said retaining means is constituted by equally spaced apart formations aligned with one another in a circle. Such formations may be obtained by means of an indented shallow depression in the center of each flange.

DESCRIPTION OF THE DRAWINGS

In the accompanying drawings which illustrate an exemplary embodiment in accordance with this invention:

FIG. 1 is a perspective view of a bogie wheel with parts broken away,

FIG. 2 is a plan view of the inner flange of the wheel of FIG. 1,

FIG. 3 is a plan view of the tire of the bogie wheel depicted in FIG. 1,

FIG. 4 is a plan view of the outer flange of the wheel shown in FIG. 1,

Figure 5:
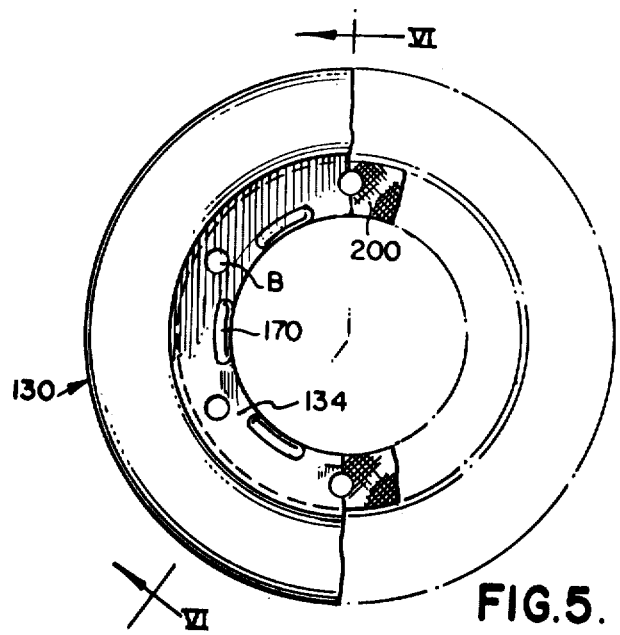
FIG. 5 is a plan view of a different tire construction.

Referring now to the drawings, a bogie wheel 10 cantilevered onto a shaft 15 is illustrated in FIG. 1 with parts broken away for facilitating the following description.

The suspension bogie wheel 10 which is journalled onto shaft 15 by means of a conventional ball-bearing 20 or the like, is adapted to support a relatively small proportion of the weight of the snowmobile (not shown) and apply it to the underlying endless track (not shown) in a conventional manner.

More precisely, referring to FIG. 1A the load $x$ to which the shaft 15 is subjected in a generally downward direction from the snowmobile frame 11 is transmitted onto the ground through wheel 10 which bears against the track 12. Thus, when the vehicle proceeds forwardly in the normal fashion, wheel 10 rolls upon the inside surface 13 of the track 12, which surface is preferably smooth just like the periphery of wheel 10. In order not to overload each individual bogie wheel 10, and also in order to properly distribute the weight of the vehicle onto the ground engaging portion of the track, a relatively large number of bogie wheels 10 are provided underneath the frame of the vehicle and arranged in a staggered configuration along two or more rows of wheels extending longitudinally of the snowmobile frame. The suspension wheels 10 which are supported in a resilient manner onto the snowmobile frame 11 are normally grouped into three individual sets, each including four such bogie wheels. FIG. 1A shows a second wheel 10' of the set including wheel 10'.

Wheels as per FIG. 1 can also be used in other applications such as, for example, load supporting rollers for high speed conveyor systems using elongated endless belts.

However, the particular construction of the wheel of FIG. 1 should permit its operation at relatively high speeds of rotation thereby making it particularly advantageous for use on modern day snowmobiles or like snow vehicles.

Referring now to the details of the wheel construction depicted in FIG. 1, it will be seen that wheel 10 consists of a solid tire 30 made of rubber or other suitable materials, an inner flange 40 and an outer flange 50 disposed in a face-to-face relationship with ball-bearing 20 rigidly secured therebetween. As seen in FIGS. 1 and 3, rubber tire 30 comprises a tread portion 32 and an inner ring portion 34. Ring 34 is adapted to be confined to the space between the peripheral marginal portions of flanges 40 and 50 which are retained in a face-to-face relationship by means of fastening means such as rivets 60, bolts, or the like. To this end, ring portion 34 of tire 30 and the peripheral marginal portions of flanges 40 and 50 have a series of circularly disposed perforations ABC defining, in the assembled condition, equidistant axial passages capable of receiving the fastening means 60.

In accordance with this invention a number of axially projecting lugs 70 are provided on the inner ring portion 34 of tire 30. Lugs 70 which project in a direction parallel to the axis of rotation of wheel 10, are preferably equally spaced from one another and also in respect of the axis of rotation of the wheel.

Preferably the number of lugs 70 is equal to twice the number of passages as herein before mentioned, in which case each lug is disposed between two successive passages in such a manner that each lug is directly behind a lug on the opposite face of tire 30. The above noted arrangement can of course be varied, but it has been found that best results can be expected when lugs 70 are disposed in a likewise manner on each side of the inner ring portion 34 and between each successive perforation. It has also been determined that for good results lugs 70 must form an integral part of tire 30 thereby permitting a more even distribution of shear force acting upon lugs 70.

On the other hand, each flange 40, 50 comprises retaining means adapted to oppose the radial thrust to which lugs 70 are subjected at high speeds of rotation. As seen in FIGS. 1, 2, and 4, the retaining means for the lugs 70 may take the form of a dish-shaped formation on the inner face of each flange and disposed centrally thereof, and defining a peripherally intended depression 90 shaped to conform to the contour of the individual lugs 70. In this fashion, the flanges 40 and 50 present a series of abutments 80 cooperatively associated with lugs 70. The foregoing arrangement is illustrated in FIG. 2 wherein the positions normally assumed by lugs 70 are represented in dotted lines 70'.

In a preferred embodiment, the circumferential length of each lug 70 corresponds generally to the circumferential distance separating two successive lugs 70, and the height of the lugs is essentially the same as the width thereof. The arrangement therefore presents itself as a series of elongated elements on each side and on the inner periphery of tire 30, and evenly distributed thereon.

Figure 6:
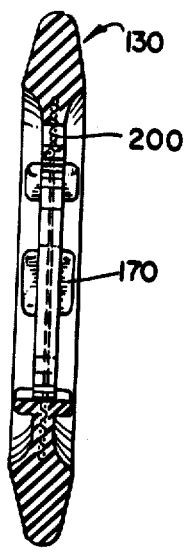
FIG. 6 is a cross-sectional view taken along line VI—VI of FIG. 5.

In FIGS. 5 and 6 a reinforced tire 130 is illustrated which corresponds generally to tire 30 of FIGS. 1 and 3, and which similarly incorporates a series of axially projecting lugs 170 as well as circularly disposed perforations B on the inner ring portion 134. However, for added resistance to tearing in the vicinity of the perforations B and lugs 170, one or more layers of inextensible fabric 200 are embedded in the body of tire 130, at least in the inner ring portion 134 thereof. The insertion of reinforcing layers 200 assists in providing a more uniform distribution of shear forces within the inner ring portion 134. Reinforcements 200 can be made of cotton or synthetic, for example nylon.

We claim:

1. For use in an endless belt suspension system, a bogie wheel adapted to be pivotably mounted to a shaft, comprising a bearing having an inner race fitted to said shaft and an outer race adapted for rotation with said bogie wheel relative to said inner race and said shaft; a first dish-shaped flange having a central aperture for receiving said shaft, a peripheral marginal portion provided with a series of small apertures equidistant from one another and from the axis of rotation of said bogie wheel, and a hub portion within said peripheral marginal portion, adapted to contact one side of the outer race of said bearings; a second dish-shaped flange having a peripheral marginal portion similar to that of said first flange and having in said peripheral marginal portion a seires of small apertures corresponding to the apertures of said first flange, said second flange also having a hub portion adapted to contact the other side of said outer race of said bearing; a solid tire made of suitable flexible material, comprising a tread portion and an inner ring portion integral therewith, said inner ring portion having a pair of radially extending faces and being confined to the space between the peripheral marginal portions of said flanges and comprising axially disposed holes corresponding to said equidistant small apertures of said marginal portions of said flanges, fastening means extending successively through the said small apertures of one of said dish-shaped flanges, the said holes of said tire and the said small apertures of the other one of said dish-shaped flanges thereby holding the outer race of said bearing and said tire between said first and second flanges; a plurality of circumferentially spaced lugs extending axially and radially outwardly from the said radially extending faces of the inner ring portion, being integral with and on each side of said tire and substantially equidistant from said axis, said flanges comprising concave recess formations encircling the lugs on the radial outer sides and the circumferential ends thereof, thus opposing any radial displacement of said lugs away from said axis.

2. A bogie wheel as defined in claim 1 wherein said inner ring portion incorporates an equal number of said lugs on each face thereof, disposed so that each lug is situated directly behind a corresponding lug of the opposite face of said inner ring portion.

3. A bogie wheel as defined in claim 2 wherein the circumferential length of each lug is approximately equal to the circumferential spacing between two successive lugs, and wherein the height and width of each lug are generally equal.

4. A bogie wheel as defined in claim 1 wherein the number of said lugs is twice the number of said passages, said inner ring portion carrying an equal number of said lugs on each face thereof, said lugs being disposed so that each lug is situated directly behind a corresponding lug of the opposite face of said inner ring portion.

5. A bogie wheel comprising, a solid tire, a pair of generally similar flanges, fastening means acting upon said flanges to maintain them in a predetermined position facing one another, and bearing means for rotatably mounting said bogie wheel onto an axle, said tire being made of rubber or other similar flexible material and comprising a tread portion and an inner ring portion integral therewith, said inner ring portion being confined to the space between the peripheral marginal portions each having a series of apertures defining axial passages for said fastening means, said passages being equidistant from one another and from the axis of rotation of said bogie wheel, said inner ring portion comprising a plurality of axially extending lugs integral with said tire and equidistant from one another and from said axis of rotation, retaining means on the inner face of at least one of said flanges adapted to receive said lugs and oppose any radial displacement of said lugs away from said axis of rotation, the number of said lugs being twice the number of said passages, said inner ring portion carrying an equal number of said lugs on each face thereof, said lugs being disposed so that each lug is situated directly behind a corresponding lug of the opposite face of said inner ring portion, wherein each flange incorporates retaining means for said lugs, and wherein each lug is elongated and disposed along the inner periphery of said tire, the length of each said lugs in the circumferential direction relative to the axis of the wheel corresponding generally to the spacing between two successive lugs, and the height of each said lug corresponding to the width thereof.

6. A bogie wheel as defined in claim 5 wherein said retaining means consists of a depression on the inner face of each said flange, disposed centrally thereof, each indentation of said depression being shaped so as to conform to the outer contour of one of said lugs.

References Cited

UNITED STATES PATENTS

| | | | |
|---|---|---|---|
| 801,263 | 10/1905 | Peard | 301—63 DS |
| 680,392 | 8/1901 | Palmer | 152—403 |
| 1,032,957 | 7/1912 | Smith | 301—63 DSX |
| 1,759,238 | 5/1930 | Merle | 301—63 DS |
| 3,309,150 | 3/1967 | Marier | 301—63 DDX |
| 3,533,662 | 10/1970 | Richards | 301—63 DDX |
| 1,753,131 | 4/1930 | Orbin | 152—384 X |

RICHARD J. JOHNSON, Primary Examiner

U.S. Cl. X.R.

152—379, 384